(12) United States Patent
Halstead et al.

(10) Patent No.: US 10,831,844 B2
(45) Date of Patent: Nov. 10, 2020

(54) ACCESSING DATABASES

(71) Applicant: Infosum Limited, Basingstoke (GB)

(72) Inventors: Nicholas Halstead, Hook (GB); Eike Spang, Basingstoke (GB)

(73) Assignee: Infosum Limited, Basingstoke (GB)

( * ) Notice: Subject to any disclaimer, the term of this patent is extended or adjusted under 35 U.S.C. 154(b) by 349 days.

(21) Appl. No.: 15/821,905

(22) Filed: Nov. 24, 2017

(65) Prior Publication Data
US 2018/0157761 A1 Jun. 7, 2018

(30) Foreign Application Priority Data
Nov. 25, 2016 (GB) .................................. 1620010.7

(51) Int. Cl.
| | | |
|---|---|---|
| *G06F 16/9535* | (2019.01) | |
| *G06F 16/2458* | (2019.01) | |
| *G06F 16/25* | (2019.01) | |
| *H04L 29/06* | (2006.01) | |
| *G06F 16/14* | (2019.01) | |
| *G06F 16/2455* | (2019.01) | |
| *G06F 21/62* | (2013.01) | |
| *G06Q 30/02* | (2012.01) | |

(52) U.S. Cl.
CPC ...... *G06F 16/9535* (2019.01); *G06F 16/2471* (2019.01); *G06F 16/256* (2019.01); *H04L 63/0428* (2013.01)

(58) Field of Classification Search
CPC ............. G06F 16/9535; G06F 16/2471; G06F 16/256; G06F 16/24556; G06F 16/2455; G06F 16/2456; G06F 21/6254; G06F 16/14; G06F 16/248; G06F 16/24553; H04L 63/0428; G06Q 30/02
See application file for complete search history.

(56) References Cited

U.S. PATENT DOCUMENTS

| | | | |
|---|---|---|---|
| 7,403,946 B1* | 7/2008 | Taylor | G06F 16/95 |
| | | | 707/612 |
| 9,256,762 B1* | 2/2016 | Roth | G06F 16/242 |
| 2007/0143245 A1* | 6/2007 | Dettinger | G06F 16/248 |
| 2007/0198495 A1* | 8/2007 | Buron | G06F 16/9537 |
| 2008/0183689 A1* | 7/2008 | Kubota | G06F 16/2471 |
| 2009/0271385 A1* | 10/2009 | Krishnamoorthy | |
| | | | G06F 16/24532 |

(Continued)

OTHER PUBLICATIONS

"The IRO-DB Approach Processing Queries in Federated Database Systems", E. Kapsammer, et al., IEEE Proc. Database and Expert Systems Applications, Sep. 1997.

(Continued)

*Primary Examiner* — Robert W Beausoliel, Jr.
*Assistant Examiner* — Mohammad Solaiman Bhuyan
(74) *Attorney, Agent, or Firm* — BainwoodHuang

(57) ABSTRACT

A method of accessing multiple independent databases with a single query having multiple expressions involves deriving from a single query at least one filtering query, searching a first one of the multiple independent databases using the at least one filtering query, applying identifiers only of the filtering set of target entries and the target query to a second one of the multiple independent databases and generating a set of result entries from the second database which thereby satisfy the filtering expression and the target expression.

20 Claims, 17 Drawing Sheets

(56) References Cited

U.S. PATENT DOCUMENTS

2012/0215763 A1    8/2012    Hughes et al.
2018/0060523 A1    3/2018    Farh et al.

OTHER PUBLICATIONS

"Query Optimization and Processing in Federated Database Systems", Ee-Peng Lim et al., ACM Conf. on Info. and Knowledge Mgmt., Dec. 1, 1993.

"SkyQuery: A Web Service Approach to Federate Databases", Tanu Malik et al., Proc. CIDR Conference, Jan. 7, 2003.

"Federated Database System", Anonymous, Wikipedia, https://en.wikipedia.org/w/index.php?title=Federated_database_system&oldid=706581519, Feb. 24, 2016.

* cited by examiner

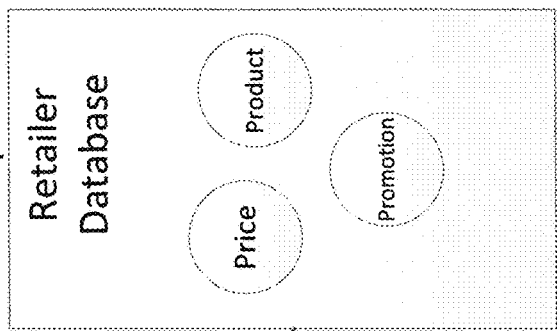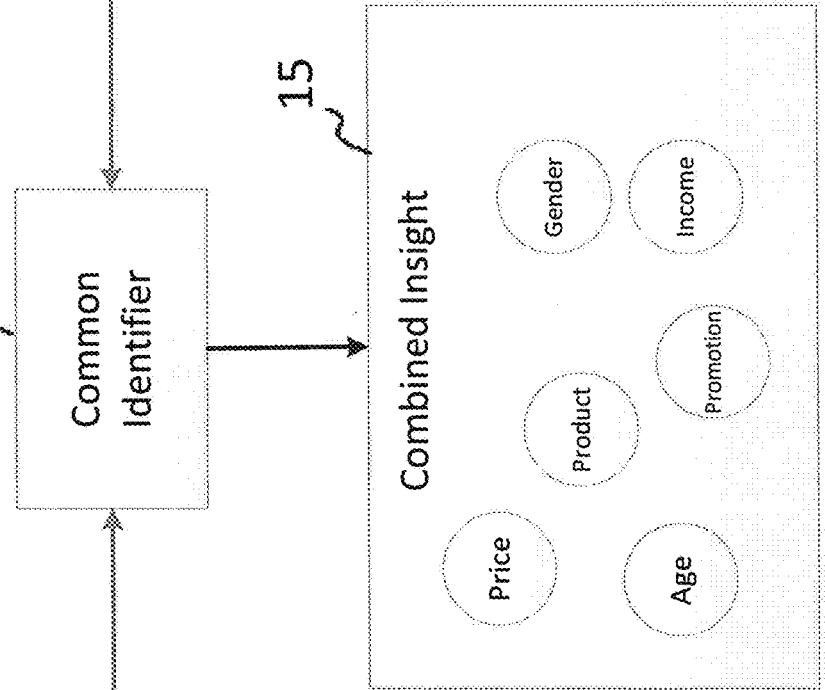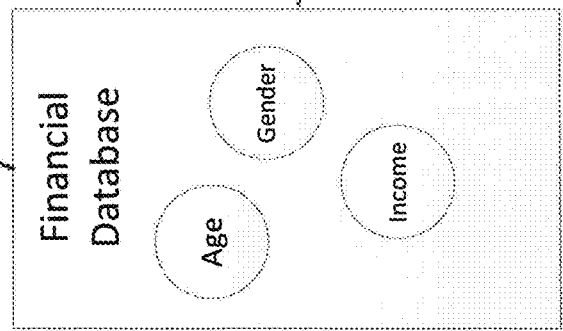
FIGURE 3

```
columns:
  hashed_pid: BYTES
  debt: UINT64
  storecard_balance: INT64
  credit_score: DOUBLE
  have_life_insurance: BOOLEAN
  number_of_credit_cards: UINT64
  address_1: TEXT
  address_2: TEXT
  address_3: TEXT
  post_code: TEXT
keys:
  - hashed_pid
credentials:
  user: dev
  password: dev
  database: database1
  address: 192.168.1.130:3306
redaction_threshold: 1000
bin_redaction_threshold: 100
max_database_connections: 151
store: mysql
executors: 4
```
— 56

FIGURE 7a

ACCESSING DATABASES

BACKGROUND

The present invention relates to accessing databases, and particularly but not exclusively to accessing multiple independent databases to provide a response to a single query having multiple expressions.

It has long been the case that it has been possible to query databases holding data to provide a response to the query. Queries are run on databases to find a match for the information being requested responsive to the query. For example, a user providing the query might want to know how many entries in a particular database satisfy a particular requirement, for example, an age range or gender requirement. There are numerous technologies available to handle this. It is becoming an increasing requirement however to use more than one database to satisfy a single query. This can be for multiple reasons. Queries may be more complex, and have more expressions requiring a match. Some expressions may be fulfilled by one database, whereas other expressions may relate to information or data held in a different database. Existing techniques for satisfying a query with multiple expressions where those expressions need to be fulfilled from different databases are not wholly satisfactory.

According to one technique, the two independent datasets are firstly merged together so that they exist as a single dataset which can then be queried with the multiple expressions. This procedure can require the transfer of large amounts of data, and a complex merging exercise at the receiving end.

Sometimes, databases are available within a single "system" such that they can be in direct communication. A technique exists to query across such databases. For this technique you have to give full read access to the databases to allow those queries. So there is no way of controlling the queries that are made on individual databases and therefore there is no way to keep the data secure. This is why the technique is only suitable for databases which are held on the same system. The technique is not suitable for databases held by independent owners.

Thus, in one known arrangement, data is collected into a single database. This puts limitations on how the data can be joined and analysed. In another technique, data is moved either physically or over the Internet, exposing it to a variety of security risks.

Further disadvantages of the known techniques include the fact that data quickly becomes less valuable and useful as it goes out of date. This means that where data is collected into a single database from multiple independent databases, this has to be an ongoing procedure. Increasingly, privacy restrictions surrounding data means that providing data from one database into a combined database can come with restrictions around privacy issues.

SUMMARY

Embodiments of the present invention which are described in the following address some or all of these issues.

According to one aspect of the present invention, there is provided a method of accessing multiple independent databases with a single query having multiple expressions, the method comprising:

deriving from a single query at least one filtering query containing at least one filtering expression and a target query containing at least one target expression;

searching a first one of the multiple independent databases using the at least one filtering query to obtain a filtering set of target entries matching the at least one filtering expression;

applying identifiers only of the filtering set of target entries and the target query to a second one of the multiple independent databases to search amongst the filtering set of target entries only in the second database for entries that match the target expression; and generating a set of result entries from the second database which thereby satisfy the filtering expression and the target expression.

The result entries can be supplied in a response message in the form of identifiers of records/entries in the second database. Alternatively, the result entries can be aggregated into groups according to attributes of the entries.

Examples of expressions which can be utilised as the filtering expression and/or the target expression include age/gender/geographical location and many other examples, some of which are set out in the following.

Aspects of the invention are not limited to the particularity of the expressions.

In one architectural arrangement, the identifiers of the target entries are returned to a central controller which derived the filtering query and target query from the single query. The central controller is then responsible for transmitting the identifiers of the target entries and the target query to the second database. Note that only the identifiers are transmitted, no actual database entries have to be exported or transmitted. This renders the technique very secure, and maintains privacy for each of the individual databases. Alternatively, the identifiers (and only the identifiers) may be transmitted from the first database to the second database, without going through the central controller. In this case, the central controller is responsible for despatching the target query to the second database, where a component (database agent/drone) at the second database coordinates receipt of the target query and the identifiers of the target entries to execute the target query on the identifiers of the target entries in the second database.

In one embodiment, the second database is identified as a target database at the time at which the target query is derived. A target database is defined herein as being a database from which a set of result entries is obtained. A filtering database is one which produces a filtering set of target entries, which is used to apply identifiers to the target database. Any database can act as a target database or a filtering database, depending on the order in which the queries are applied. Selection of a target dataset can be done on the basis of the expressions used in the target query, as compared with the expressions used in the filtering query. Splitting the single query into at least one filtering query and at least one target query can be done in an optimised fashion by assessing the nature of the databases over which subsequent queries can be run.

It is possible to derive more than one filtering query from the single query. Each filtering query can contain more than one filtering expression. For example, one database might hold data to match with more than one expression in a single query. Where there are multiple filtering queries, after a first filtering query with a first filtering expression (or multiple expressions) has been used to search the first database, the next filtering query is used to search another database only against the filtering set of target entries which matched the first filtering expression. Thus, multiple "filtered identifier sets" can be generated from each database in turn for use in filtering a subsequent query. Note that the term "filter" is used herein in two different contexts. A filtered set of identifiers is produced from a filtering enquiry, which is then used to filter entries against which a subsequent query is run.

Where the result entries are aggregated into groups, these groups can comprise statistical bins, each bin containing result entries with attributes in a parameter range for that attribute. The range can be a predefined range or can be calculated. In order to improve anonymization, a redaction threshold of a minimum number of entries per bin may be applied and/or of the total number of entries.

Where identifiers of the target entries are applied to a database, they can be applied as a set of identifiers which have been encrypted in some way (for example, hashed), or as a bloom filter. In this way, it becomes virtually impossible for any person seeking to obtain information about the query to glean anything useful from any isolated transmission between the databases or between the database and the controller.

According to another aspect of the invention, there is provided a control module configured to: receive a query having multiple expressions; derive from the query at least one filtering query containing at least one filtering expression and a target query containing at least one target expression; identify a first one of multiple independent databases and apply the at least one filtering query to the identified first database; receive identifiers of a filtering set of target entries matching the at least one filtering expression as a result of applying the filtering query to the first database; identify a second one of the multiple independent databases; and cause the identifiers only of the filtering set of target entries to be applied to the second database with the target query to search for any of the target entries in the second database that match the target expression; whereby a set of result entries from the second database which satisfy the filtering expression and the target expression is generated.

A further aspect of the invention provides a computer system comprising a control module as defined above which is in communication with multiple independent databases via a communication network, wherein each of the multiple independent databases is in communication with the control module via a separate independently operable communication link, and wherein the step of applying the filtering query to a first one of the databases comprises transmitting the filtering query over a first one of the communication links to the first database, and wherein the step of applying identifiers of the target entries and the target query comprise transmitting the identifiers and the target query to the second database over a second communication link.

The first and second independent databases may be at separate geographical locations and/or at separate IP addresses. They do not need to have any common owner/manager/controlling entity.

In the embodiments described herein, each of the independent databases is associated with a local database agent (drone) which is configured to receive the filtering query (or queries) or target query respectively and apply it to their associated database. Each drone may have access to a configuration file which defines the content of the associated database.

According to another aspect of the invention, there is provided a method of storing data comprising:

(a) receiving data from a first origin database populated by a first database manager;

(b) normalising the data according to a first set of configuration parameters including at least one indexing field (c) storing the normalised data in a first recipient database (d) generating a configuration file for a local access module coupled to the first database which identifies the configuration parameters including the indexing field wherein steps (a) to (d) are carried out on a second origin database populated by a second database manager independent of the first database manager, with a second set of configuration parameters which includes the same at least one indexing field to populate a second recipient database, the method comprising storing the same at least one indexing field for use in accessing the second recipient database based on data entries derived from the first recipient database.

For a better understanding of the present invention and to show how the same may be carried into effect, reference will now be made by way of example to the following drawings.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 3 is a schematic diagram illustrating a specific example where customers' transaction data is joined with their corresponding demographics data from two independently controlled databases;

FIG. 7a is an example of the configuration file as illustrated in FIG. 7;

DETAILED DESCRIPTION

Nowadays every company holds valuable data, for example concerning attributes of consumers or potential consumers who may wish to access that data. Sharing customer data among different companies creates complex privacy and legal issues, as the data contained in customer records may be shared involuntarily. The problem is exacerbated by the fact that different departments within the same company, or among different companies, may store data at different locations, and thus moving and selling data across sites poses security risks that may result in value leakage. Furthermore, different companies' storage formats are often not compatible and therefore increases the complexity in sharing customer data.

Figure 1:
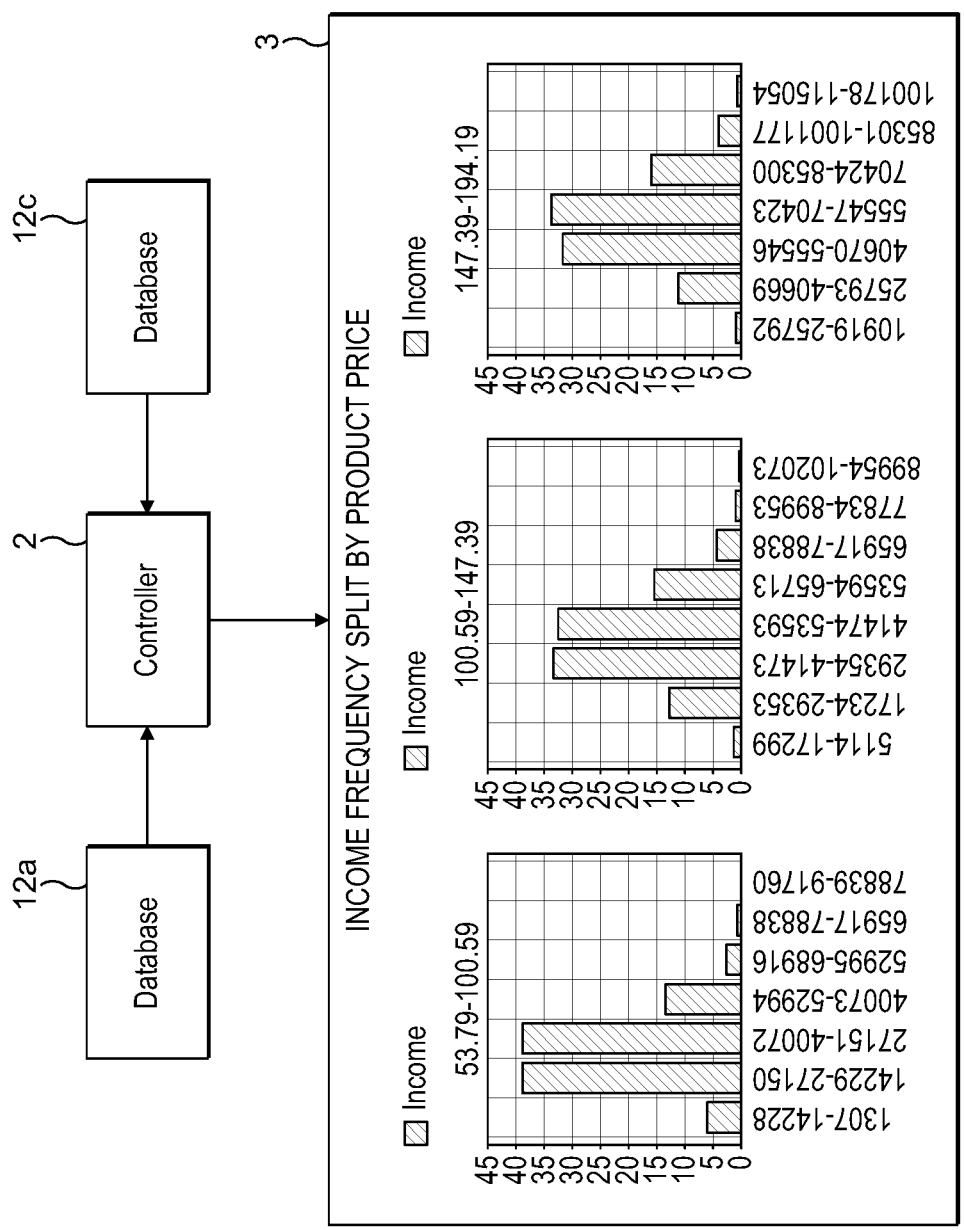
FIG. 1 is a schematic diagram illustrating a data joining system at a high schematic level.

FIG. 1 is a schematic diagram of a novel solution to address these issues. Reference numeral 12a denotes a first database (e.g. a database of a financial organisation) which holds certain attributes within its records (entries). Reference numeral 12c denotes a second database (e.g. a database of a retail organisation) which holds certain attributes within its records (entries). The attributes in one database may be different to the attributes in the other database. Some entities may exist in both databases, and the challenge is to combine knowledge from both databases by joining data in a fully privacy compliant way without any records leaving each company's data centre. Reference numeral 2 denotes a controller which provides such a data joining service. An example output graph visible to a user is denoted by reference number 3; in this example it provides information on the spending habit of customers categorised by their annual income.

The terms database and datasets are used interchangeably herein to denote a structured set of data records. In practice a dataset may comprise multiple databases under a common control (not independent).

Figure 2:
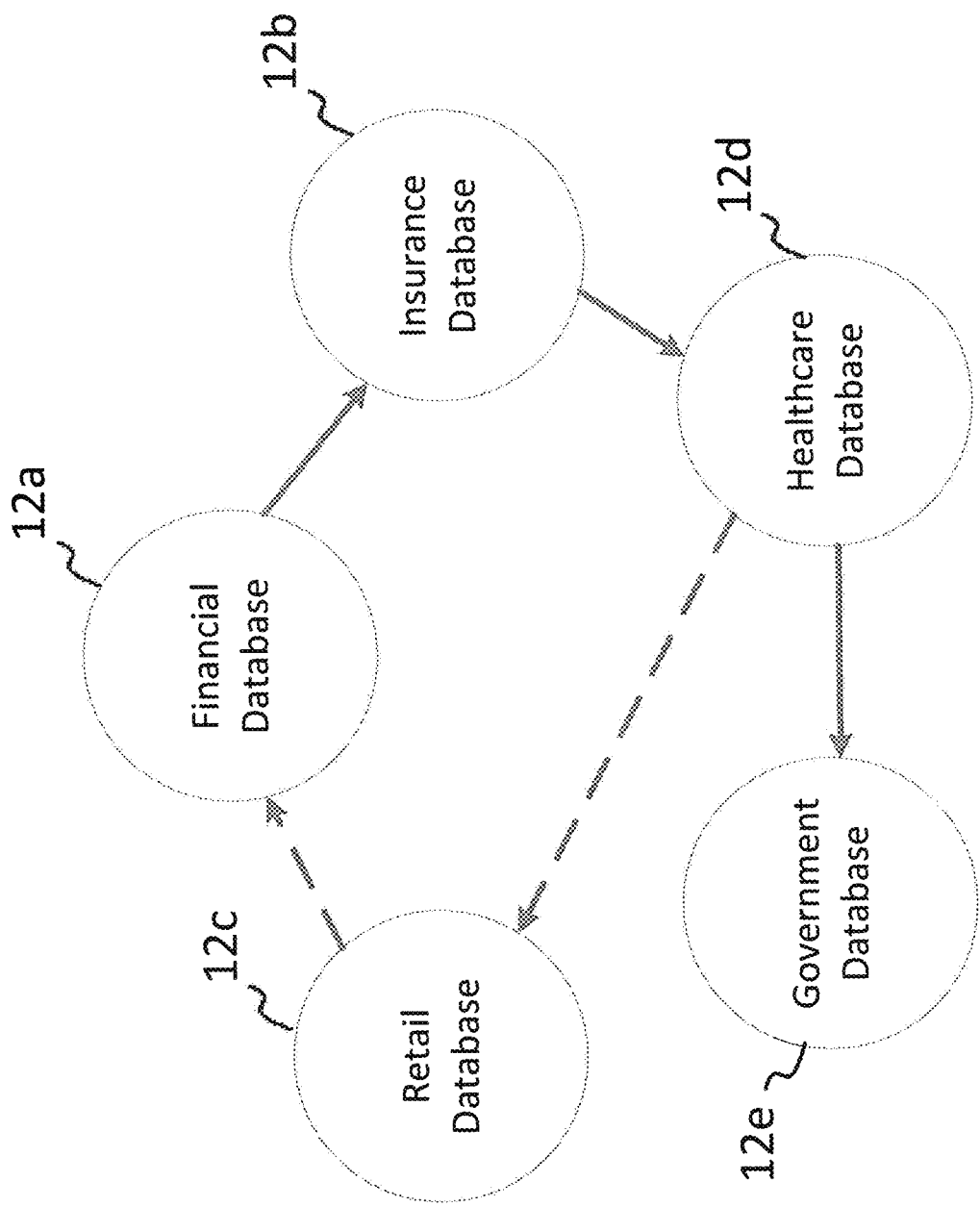
FIG. 2 is a diagram illustrating the method of data joining.

FIG. 2 shows schematically how data joining works for a data joining system with three organisations (Healthcare, Retail and Financial) shown by the dotted arrow, and for four organisations shown by bold arrows (Government, Healthcare, Insurance and Financial). In any case, queries can be created according to the existing datasets at each of the queried companies, in order to fully utilise all of the data available. A suitable filter, such as a list of hashes or Bloom filter, is created from a first query to be applied to one or more of the fields within each dataset to filter entries to be checked against a second query. Those entries in the dataset matching the second query run against the filtered entries are then sent back to the cloud as returned data. The joining of combined datasets creates greater knowledge than a single database can offer on its own and in some cases allow new datasets to be created. Common identifiers (or joining factors), such as email address and telephone number, are used to identify data associated with a particular entry across different datasets. In some cases different common joining factors may be use depending upon their availability in the target datasets. The final results as presented to the user can be originated from any one of the queried organisations, but each of the returned data can be configured to meet individual privacy/redaction policies.

Data joining as described herein may be employed to join internal data from databases belonging to the same entity, external data from databases owned by a plurality of entities, or data from databases physically located across different countries. For example when joining internal data, the data joining system provides a solution to combine datasets that are not allowed to be cross-contaminated, or are intentionally segregated by access restrictions, internal policies and regulations. It is also useful for joining many internal databases that are too large to be managed in a single instance, or combine knowledge of different databases across a large corporation. When deployed to join external datasets, the data joining system allows the companies to benefit from pooling their knowledge and therefrom creates new datasets, as well as to acquire knowledge of sensitive data that would not normally be shared. Furthermore, the data joining system allows data to be sold into newly created market places. In some cases the use of the data joining system overcomes juridical restrictions and allows data to be exported from a particular jurisdiction. The data joining system is also useful for joining datasets that are time consuming to synchronise or technically impractical to move among different countries.

Databases which can be accessed using the data joining service form a data joining network. As more companies subscribe to the data joining network, they each form a node on the network and become a part of a combined dataset that incorporates many small datasets, e.g. the data joining network may act as a central database. Furthermore, there is no limit to the number or size of the combined datasets across the subscripting companies, whilst each of them remain in control of who they wish share their knowledge with.

FIG. 3 illustrates a specific example where a retailer cross-examines customers' transaction data and purchase history (e.g. price, product and promotion of past purchases) with their corresponding demographics data (e.g. age, gender and income) from a bank's dataset, using email addresses as a common identifier 13 (or joining factor). This provides a combined insight of customers 15 and allows the retailers to create bespoke promotion strategies for their target customers. For example, the combined dataset between the bank and the retailer reveals which promotions are used most frequently by different aged customers and based thereon tailor promotion strategy.

The novel solution offers a secure data sharing among different databases. In cases where the returned data is given in statistical form, customer records associated with the returned data never leave the owners' database. Moreover, the statistical data can comply with redaction rules to protect each individual customer's identity. Redaction control can be applied over the whole database or individual data fields.

The controller 2 can be embodied in the 'cloud' to provide a cloud service that facilitates data joining. The cloud service stores instructions for data acquisition (e.g. filtering expressions), but not the actual returned data. Moreover the queries can be controlled in real time and so they can be terminated as required.

In terms of access control, each sharing database is given its own set of access control so to allow bespoke control on who they wish share their knowledge with. This prevents accidental sharing of commercially sensitive data that would otherwise be detrimental to the owner of the sharing database. Restriction may also be imposed on queries requesting sensitive combination of fields in the dataset.

The described embodiments of the present invention allow data from multiple discrete databases to be combined, allowing different owners of databases to consent to mutual use of each other's data without compromising security of their own database or anonymity.

Figure 4:
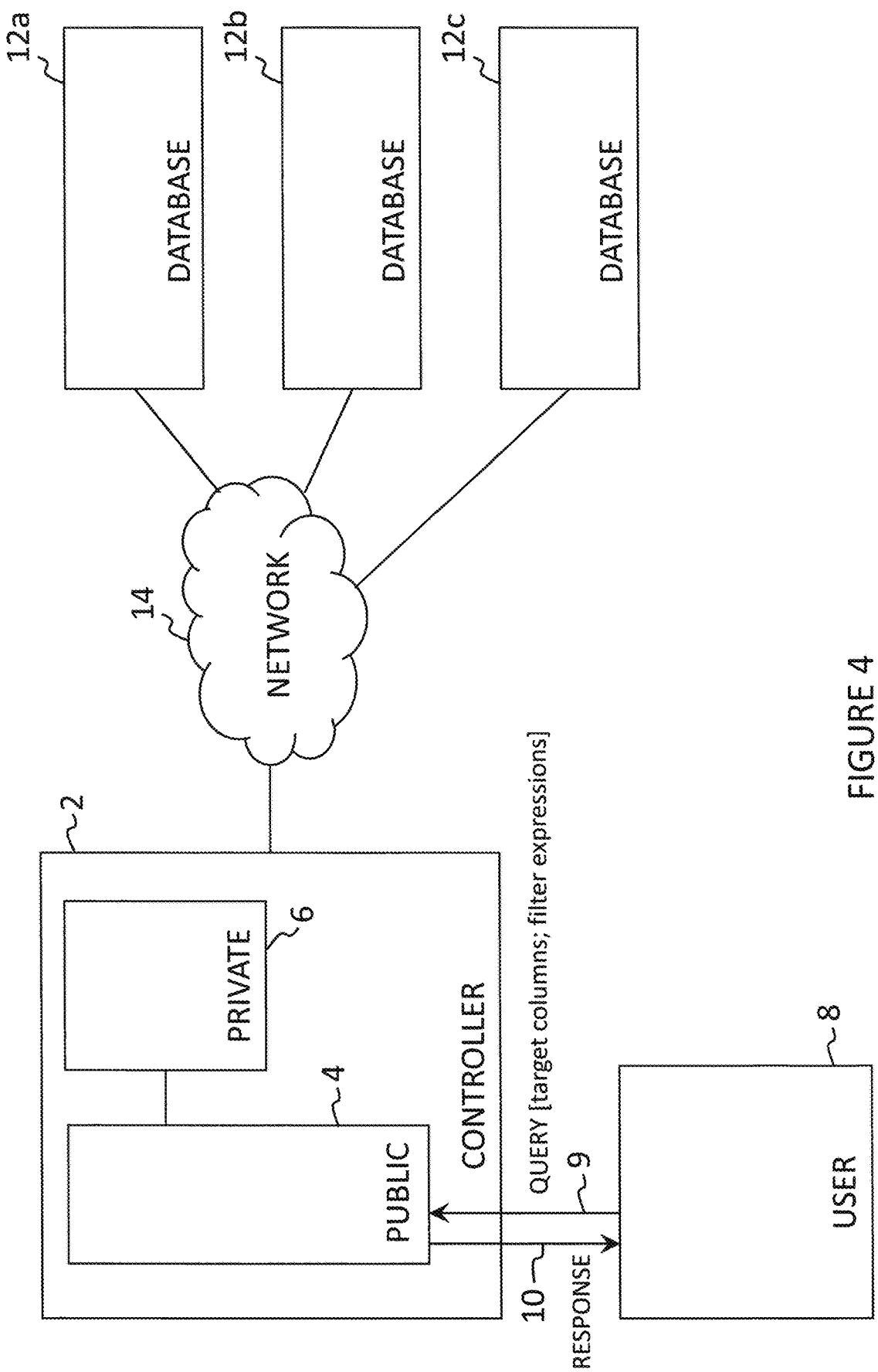
FIG. 4 is a schematic diagram illustrating a possible architecture for implementation of some embodiments.

FIG. 4 is a more detailed schematic block diagram of a system in which data from multiple discrete databases can be combined upon receiving a query from a querying user. The system comprises the central controller 2 which has a publically accessible component 4 and a set of private components 6 which implement a data combining process. The central controller can be implemented by software, firmware or hardware or any combination thereof. It could be a single server executing a computer program, or distributed over multiple servers, each running a load computer program, autonomously or in a distributed computing fashion. A user 8 has access to the controller 2 via a public interface, for example, which can be an application programming interface (API) in the controller 2. A user could be in contact with a controller 2 in any other way. Reference to a user herein refers to a user and/or a user device which can be any suitable computer device capable of generating and exchanging electronic messages. In particular, a user can generate a query 9 which he wants to run over multiple databases. That query can be generated by a human user providing manual input at an interface of a computer device, or it can be generated autonomously and automatically by a computer device itself.

Example queries are given later, together with examples of results of the queries delivered to the user.

The user 8 receives a response 10 following data combining processes carried out at the controller 2. The response 10 can take the form of a set of target entries resulting from combining the entries in the databases which satisfy expressions in the query. Alternatively, the response 10 can take the form of aggregated data as described in more detail herein, shown for example in a graphical format. The controller 2 is connected to multiple databases 12a, 12b, 12c. It can be connected via any suitable communication network 14, which could be a private Intranet or public Internet. Before going into a more detailed description of the architecture of the system, the basic principles of the data combining process will now be described. For this, reference is made to FIG. 5.

Figure 5:
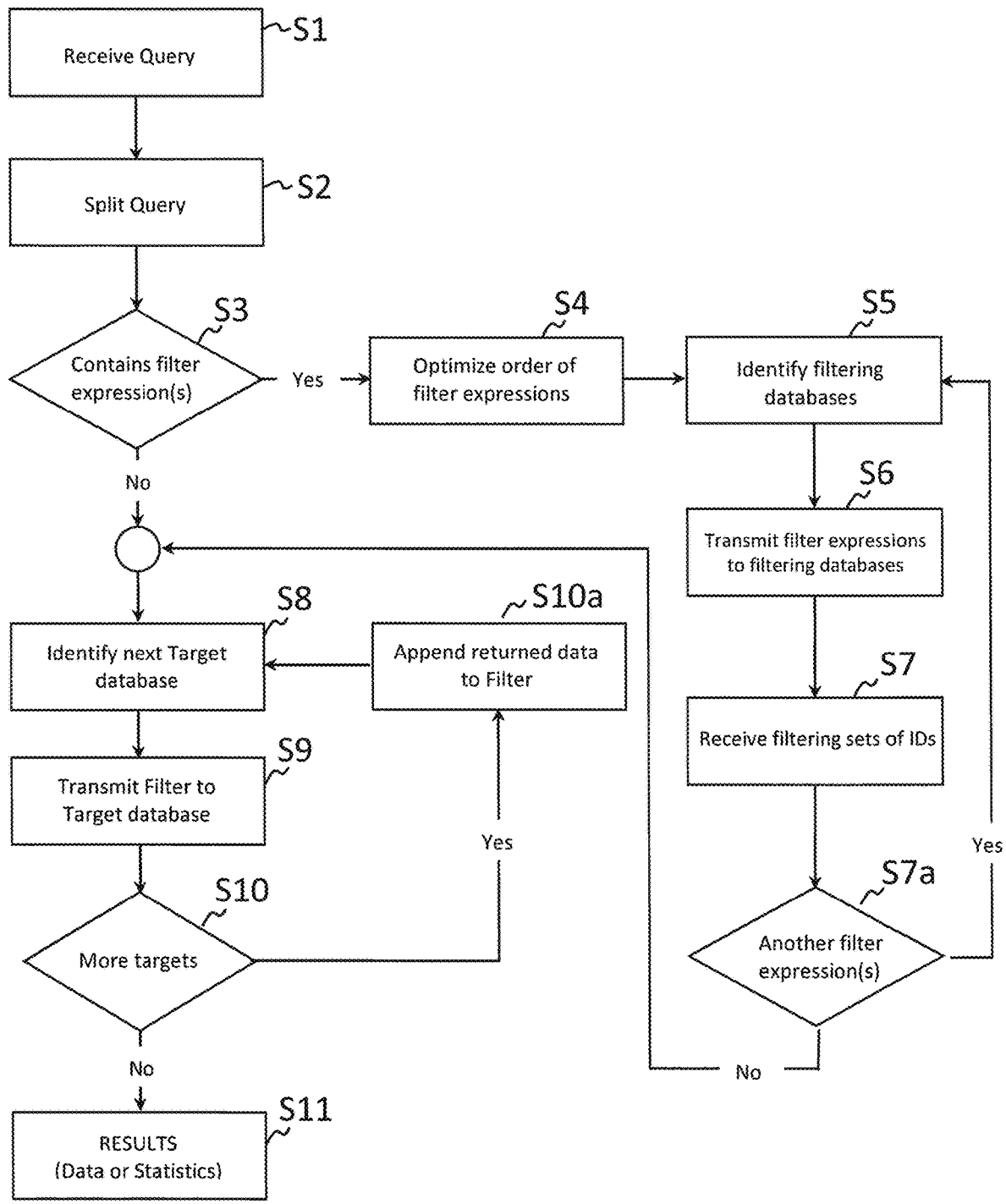
FIG. 5 is a flowchart illustrating processes carried out at a central controller.

As illustrated in FIG. 5, the first step of the process is the receipt of a query by the central controller 2 from the user 8, step S1. The query 9 comprises one or more target "columns" to receive data or statistics, and a set of filter expressions which the data or statistics should satisfy. For example, the query could ask for the number of data entries satisfying a certain age range and certain gender specification. Some examples are given later by way of illustration not limitation.

At step S2, the query is split into two queries, which are referred to herein as a filtering query and a target query. At step S3, a check is made to see whether or not the filter query contains filter expressions. If it does, the flow moves to step S4 where an order of the filter expressions is optimised. The purpose of this optimisation is to determine an order in which filter expressions are to be submitted to one or more database, as discussed in more detail later. At step S5 filtering databases are identified, each database being selected as the most appropriate database to deal with the particular filter expression. The central controller 2 stores information about all the databases to which it has access to allow it to identify appropriate filtering databases. This information is stored using a drone graph (44 in FIG. 7) described later. Each database is associated with a drone, which serves as a database agent on the software side. For example, the controller can identify which of the databases contains information related to the required filtering expression. At step S6, each filter expression is sent to the most appropriate database. When the first filter expression is sent to the first filtering database, it is run against the database to identify entries in that database matching the terms of the filter expression. For example, if the first required expression is an age range between 18 to 25, a filtering set of identifiers is returned from that database identifying database records satisfying the expression, for example, all the entities in the database aged between 18 to 25. Thus, the age range has produced a filtered set of identifiers. This filtered set can then be transmitted to a subsequent filtering database to act as a filter along with the next filter expression of the query, wherein the next filter expression is compared only to the entries in the database which satisfy the identifiers of the filtered set. Step S7 denotes the function of receiving the filtering sets of IDs, and step S7a the determination of whether there are additional filtering expressions. Once all filtering expressions have been utilised and run against their respective filtering databases, a final filtered ID set is produced. The process then moves to step S8 where a target database is identified for execution of the target query. For example, the target query in this case could be gender-based, for example, identify all females. In step S9, the filtered dataset and the target query are applied to the identified target database where the target query is run only against the identifiers which satisfy the identifiers in the filtered dataset. Note that a single filter expression can be sent to multiple databases, or multiple filter expressions can be sent to a single database. Note also, that in some cases there may be no filtering expressions (step S3) in which case the target query is just passed straight to one or more target database. It is important to recognise that no data records are transferred, only record IDs.

Note that there may be more than one target database, as well as or instead of, multiple filtering databases. Thus, a database could both produce a result set of record data and a filtering set of identifiers for a subsequent query. Note that one expression may be run against multiple databases, for example when more than one database satisfies the expression, but perhaps with incomplete records.

Step S10 checks for whether there are any more target queries or more target databases that need to be addressed with the target query and in the case that they are, the returned data is appended to the filter S10a and steps S8 and S9 run again on the next target database.

When all target databases have been queried, the final results are returned in step S11. Note that the results may be actual data entries, or aggregated statistics, depending on the context in which the method is applied. For example, "real data" could be provided in the results in a company internal implementation, while aggregated statistical results could be provided for public usage, for reasons of security and anonymity.

Figure 6:
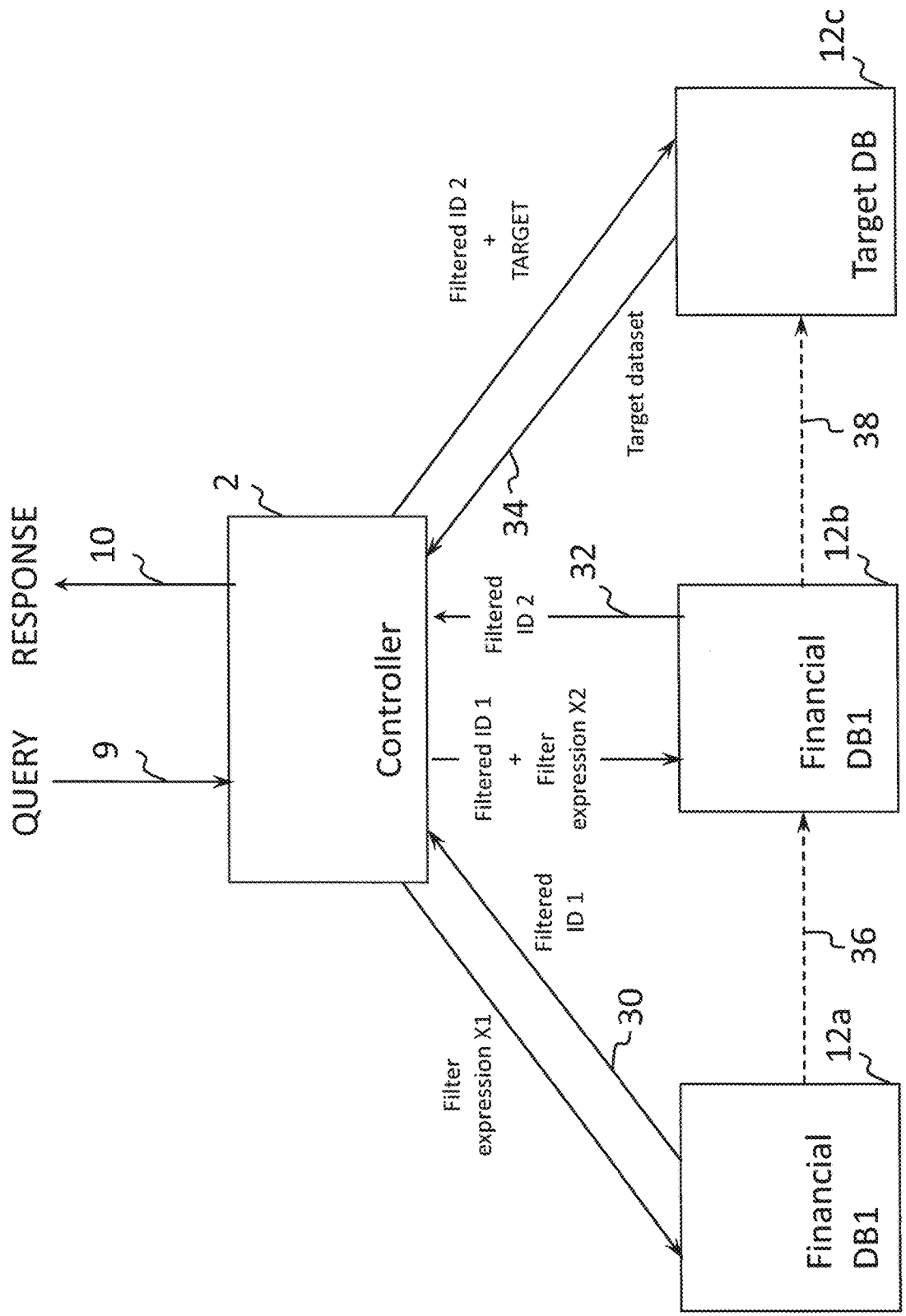
FIG. 6 is a schematic diagram illustrating the flow of FIG. 5.

FIG. 6 is a schematic architectural diagram which gives one example of the flow described with reference to FIG. 5. As shown in FIG. 6, a query 9 is received at the controller 2. In this case, the controller 2 splits the query into three separate queries, a first query with a first filter expression X1, a second query with a second filter expression X2, and a third target query with a target expression TARGET. As an example, the first filter expression could be an age range (e.g. between 18 to 25), the second filter expression could be income (e.g. more than £60,000) and the target expression could be gender (i.e. all females). The first query with the first filter expression X1 is sent to the first database 12a of a financial organisation labelled Financial DB1. This database is determined by the controller as being the best database for establishing data entries fitting a certain age range. A filtered set of IDs 1, 30, is returned to the controller 2. This filtered ID set includes record identifiers or records from the filter database Financial DB1 satisfying the first filter expression (that is, all data entries fitting the age range between 18 to 25). The filtered ID set 1 can comprise a list of hashed identifiers, where each identifies a data entry in the database, or can be a bloom filter or the like.

A bloom filter is commonly applied to test whether an element is a member of a set. It consists of a set of positions which can be set to '1' or '0' depending on whether the position is occupied. In the present context, the positions represent identifiers, and each identifier identifies one or more rows of the database. More specifically, a bloom filter tests whether an element is certainly not present and therefore remove the need to seek elements that don't exist in a set. A bloom filter query returns a result of either "possibly in set" or "definitely not in set". A bloom filter is particularly useful if the amount of source data would require an impractically large amount of memory if "conventional" error-free hashing techniques were applied. Moreover, the original used list of hashes cannot be generated from the filter, so it provides another level of anonymity. The use of bloom filters (and other binary structures) is described in more detail below in reference to FIGS. 14-15a/b.

The filtered ID set 1 and the second query with the second filter expression X2 is then addressed to the second database 12b of another financial organisation labelled Financial DB2. This database has been identified by the controller as being a good database for extracting income-related data.

The query which is run over the second filter database is a query which matches the second filter expression X2 against only those database entries identified by the filtered ID set 1. This is therefore potentially a faster query to run and might reduce the amount of data to transfer. Moreover, note that there has been no requirement to "join" the records of the first and second filter databases into a common dataset. Thus, these databases can be completely independent, logically and/or geographically and do not have to have any common control or ownership. Note also that no raw data (database records) is transferred.

A second filter ID set 2, 32, is returned to the controller 2 following the query which is run on the second filtering database Financial DB2 12b. The controller 2 sends the second filter ID set 2 and the target expression to a target database which it has identified. The result 34 of running the target expression TARGET against the identifiers in the filter dataset 2 (or the bloom filter) is returned to the controller 2. The controller 2 provides the response 10 to the user, which is either raw data or aggregated data as discussed herein.

As an alternative architectural possibility, the first filter ID set 1, 30 and the second filter ID set 2, 32 do not need to be returned to the controller. Instead, they could be passed directly from the first filter database to the second filter database, and from the second filter database to the target database respectively as indicated schematically by the dotted line arrows 36 and 38 moving to the right in FIG. 6.

Figure 7:
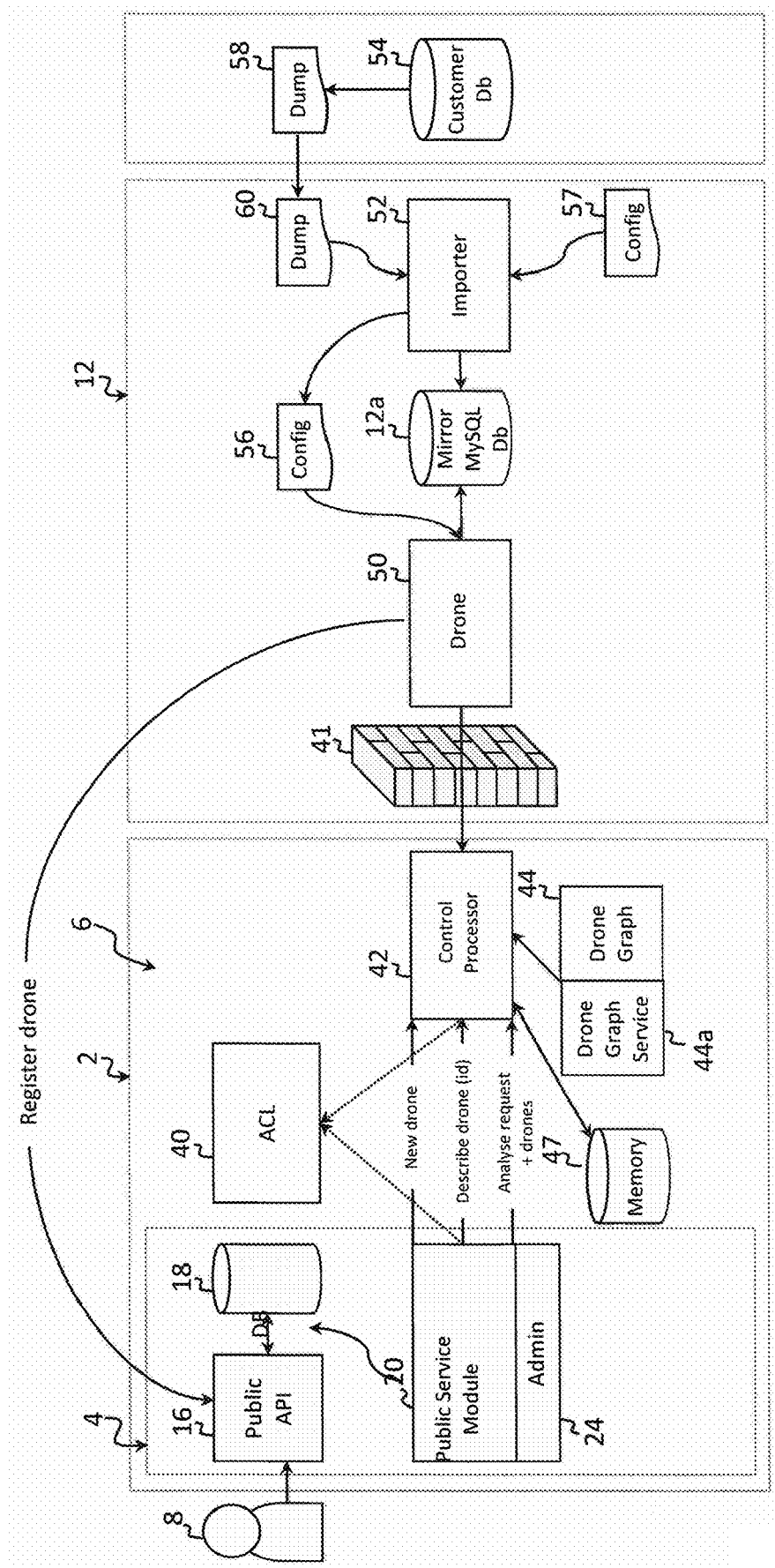
FIG. 7 is a more detailed architectural diagram of a computer system for accessing multiple independent databases.

FIG. 7 is a more detailed architectural diagram illustrating the component at the controller 2 and at a database site 12. The term "database site" is used herein to denote any site where one or more databases may be located. A database may alternatively be referred to herein as a "customer site", indicating that the database is owned by a particular customer. One distinct advantage of the described embodiments is that searches may be done across multiple databases which may be individually owned by different customers. One such database site is shown in FIG. 7. The public part 4 of the controller 2 comprises a public API 16 which is connected to a database 18 and to a public service module 20 which provides an administration interface 24.

The public API enables the user 8 to interact with the system. The administrator interface interact with an access central layer (ACL) components to set up permission, etc. for individual users.

Public parts 4 of the controller communicate with private components within the private part 6. The private components comprise the Access Control Layer (ACL) component 40, and a control processor 42. The access control layer 40 conditions outgoing requests according to the redaction policies of the querying customer and their subscription status. The processor component 42 is responsible for the processing functions which have been described, and for communication with database sites 12. Each database site comprises a firewall 41 for security purposes. The database site 12 incorporates a database 12a (one of the databases that has already been described). The database 12a is associated with a database agent or drone 50 which is the component which acts to facilitate receipt of queries from the controller 2 and the execution of running those queries over the database 12a.

The database site 12 shown in FIG. 7 has a single database and a single drone. However, there may be a plurality of drones provided for a particular site, each associated with a distinct database. In the present embodiment, there is a 1:1 relationship between drones and databases. The database site 12 comprises an importer module 52. The importer module 52 plays the role of importing data from a "raw" customer database 54 into the database 12a, against which queries can be run. A configuration file 57 can be provided for controlling the operation of the importer. For the sake of completeness, reference numeral 58 denotes a database dump received from the customer database 54, and reference numeral 60 denotes the transfer of that database dump into the database site 12 so that it can be provided to the importer module 52. The configuration file which is supplied to the importer can be manually generated or automatically generated. It defines in particular a set of identifiers which are to be used by the database 12a such that all databases against which queries can be run have at least one common identifiers. This could, for example, be personal information such as a name or email address. In addition, certain items of data to populate the data entries may be required by the configuration file. The importer module 52 supplies a configuration file 56 to the drone 50 to inform the drone about the structure of the database 12a against which queries can be run. An example of the configuration file 56 is given in FIG. 7a.

User requests are handled through the public API via the public service module 20 to the control processor 42. The message "analyse request+drones" in FIG. 7 denotes a request from a user to analyse an input query and to identify the appropriate drones to which the split queries should be sent. New drones can be added by the administration interface 24 of the public service module 20. The drone registration process is described later below.

There follows now a more detailed description of bloom filters applied to datasets to allow their use as a filter.

Figure 14:
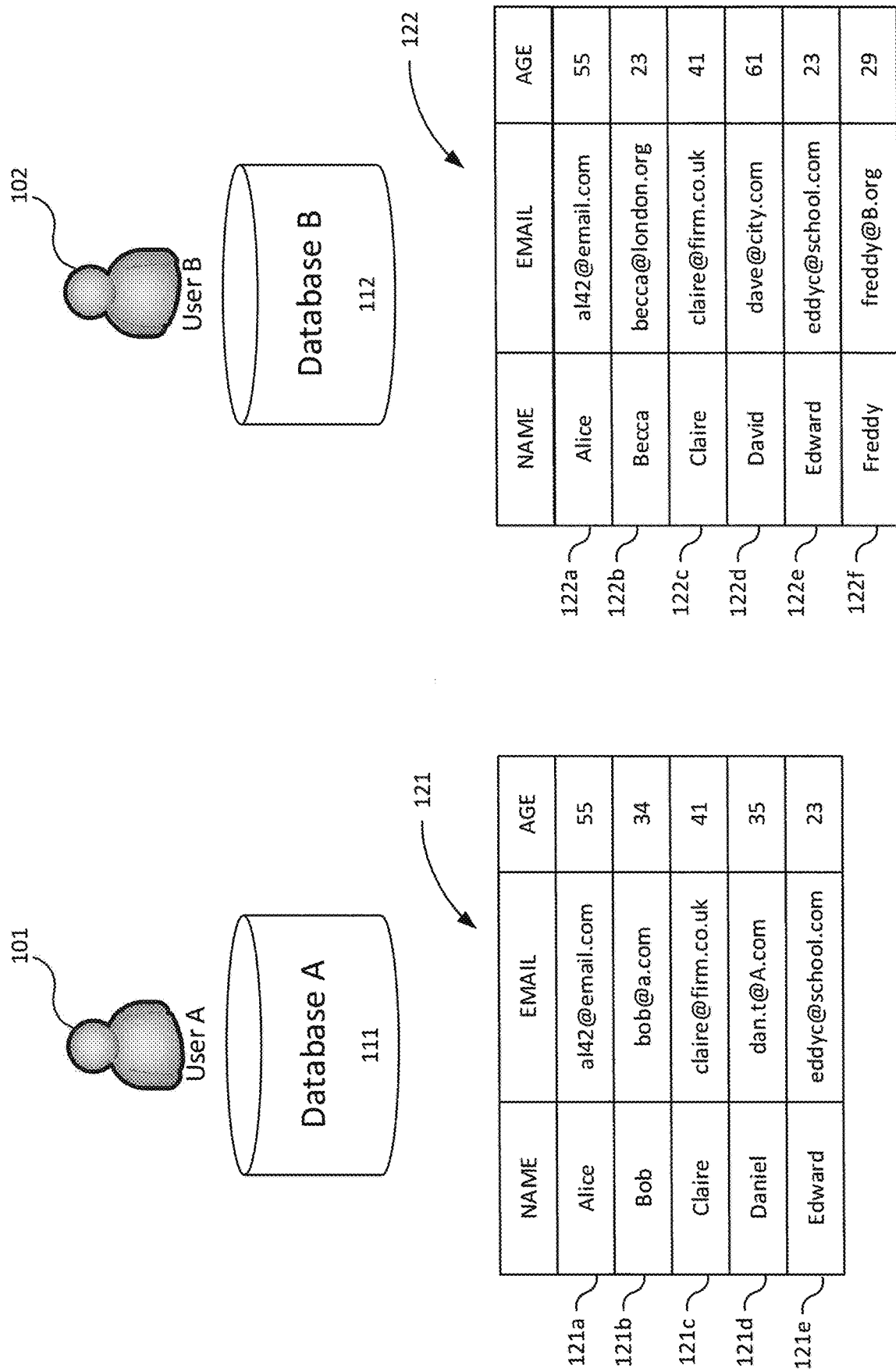
FIG. 14 shows two example datasets to be joined.

FIG. 14 shows a first user 101 (User A) who is the manager of a first server 111 and a second user 102 (User B) who is the manager of a second server 112.

User A uses the first server 111 to store a first data set 121 (Database A) comprising a plurality of entries 121a-e. In this example, each entry 121a-e relates to a person and comprises three fields of information about that person: name; email address; and age. It appreciated that greater or fewer fields may be present and also that only five entries 121a-e are shown for the purposes of explanation. That is, in practice the data set 121 may contain hundreds, thousand, even millions of entries.

Similarly, User B uses the second server 112 to store a second data set 122 (Database B) comprising a plurality of entries 122a-f This data set 122 also comprises entries having three data fields (again name, email address, and age)

but in general the two data set 121, 122 may comprise one or more fields that are not commonly present.

As shown in FIG. 14, the first data set 121 contains five entries (people) 121a-e and the second data set 122 contains six entries (people) 122a-f. Some of these are unique to one of the data sets (e.g. "Bob" 121b appears only in the first data set 121 and not in the second 122), but when datasets are to be joined, the assumption is that at least some entries "overlap" or "intersect", i.e. they reference the same person. For example, the first entry 121a in the first data set 121 is "a 55 year old woman called Alice with email address al42@email.com", and the first entry 122a in the second data set 122 is also "a 55 year old woman called Alice with email address al42@email.com". That is, although these are separate data entries 121a, 122a themselves, it can be identified that they should be considered as referring to the same person if there is a match in a field which uniquely identifies that person (such as email address, social security number, etc.). This is particularly useful when the two datasets 121, 122 store different information about the individuals. For example, dataset 121 may additionally (not shown in FIG. 14) store data relating to the income (e.g. salary) of each person and dataset 122 may store data relating to health (e.g. medical records) of each person.

As mentioned above, a binary structure (such as a bloom filter) can be generated for each key in the dataset which therefore encodes information about the data entries having that key in that dataset.

One example of such a binary structure is a bloom filter. A bloom filter is a bit string of length n onto which has been encoded information about a set of data values. The (n) bits of the bloom filter are all initialised to 0. A data value is encoded onto the filter by applying a set of k hash functions to the data value which each return (modulo n, if the algorithm allows for results greater than k) a respective integer between 1 and n (that is, the data value is transformed into a set of k integers) which are then interpreted as positions within the bit string. The bits at these (k) positions are then re-written to 1. Further data values can be written to the (same) bit string using the same method. If one or more of the hash functions, when writing a further data value, points to a bit in the filter which is already 1 (i.e. written to encode some earlier data value), it remains a 1 after writing the further data value.

Note that k can be equal to 1 (though it usually greater). That is, a single hash function may be used.

The bloom filter, once written, allows for the quick determination that a test data value is not a member of the original (encoding) set. To do so, the same k hashes are performed on the test value. If any one of the bits in the string at those locations is a 0, the test value was not a member of the original set (otherwise this bit would have been rewritten as a 1).

FIG. 15 shows construction of a first bloom filter 401 from Database A. In this example, n=32 and k=3. That is, the bloom filter is 32 bits in length and three hash algorithms are used.

Figure 15A:
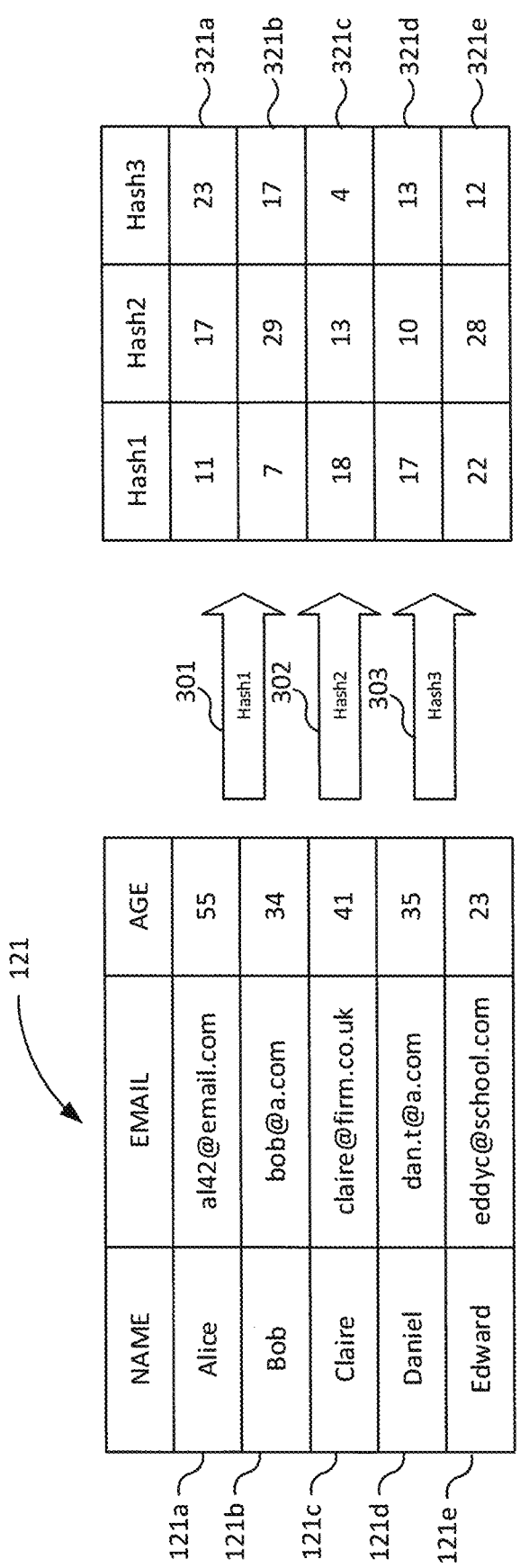
FIGS. 15a and 15b show the construction of a bloom filter.

In FIG. 15a, the first hash algorithm 301 (Hash1), the second hash algorithm 302 (Hash2), and the third hash algorithm 303 (Hash3) are each performed on the first data entry 121a (Alice), resulting in a triplet of integers 321a (10, 16, 22). The bits of the bloom filter at these positions are accordingly set to 1. The first data entry 121a is thus encoded in the bloom filter. The same three hash algorithms 301, 302, 303 are applied to each of the other data entries 121b-e resulting in corresponding integer triplets 321b-e which are also written to the bloom filter.

Figure 15B:
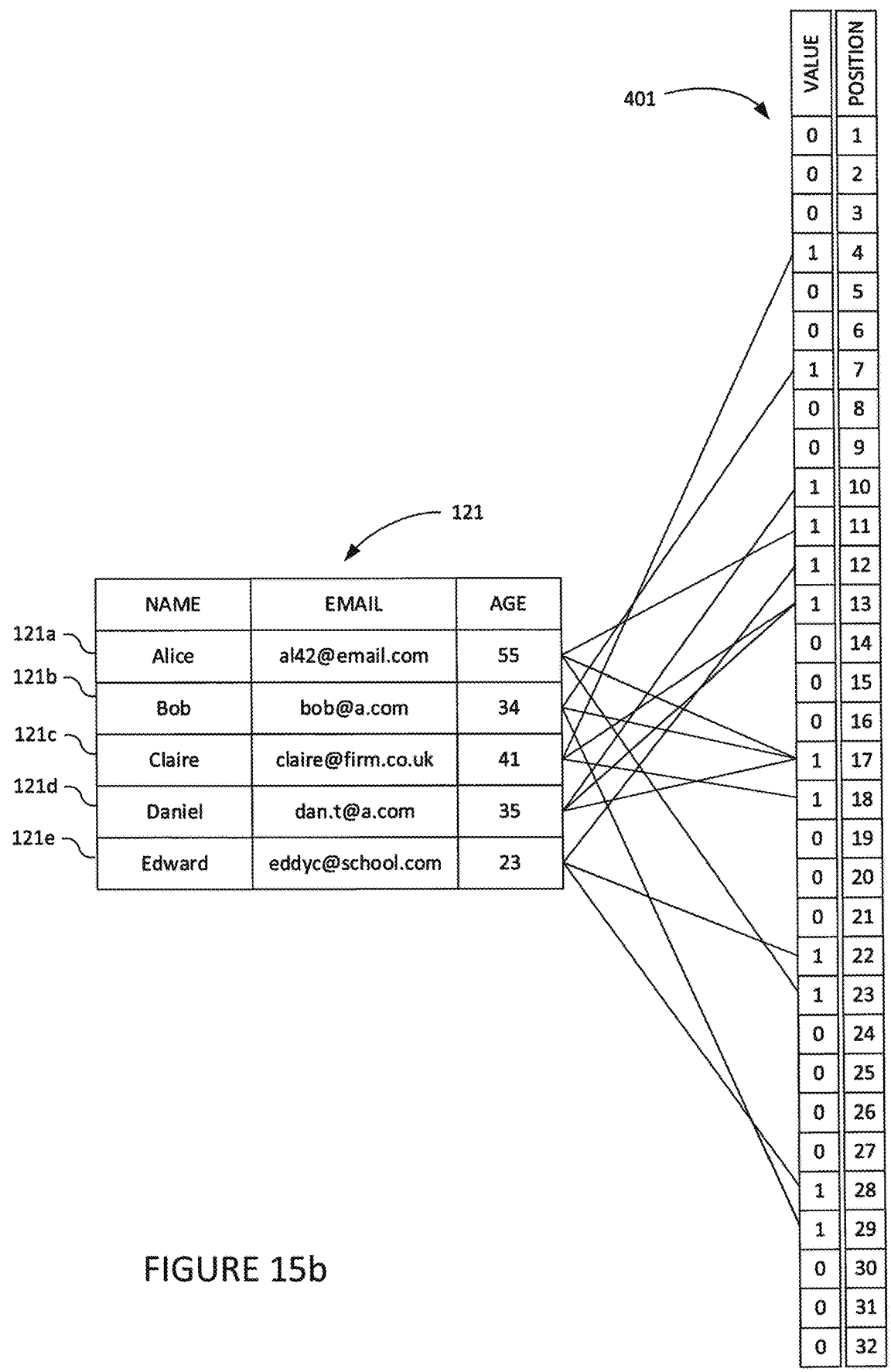

The end result of this process is illustrated in FIG. 15b. The resulting bloom filter 401 comprises a string of 32 bits, the values of which encode information about the first database 121. Note that, as known in the art, the hash algorithms 301, 302, 303 are each designed such that, for a random input, they return each integer between 1 and 32 (between 1 and n) with a uniform distribution. Hence, some data entries 121 when written to the filter 401 may "overlap" in the sense that they may hash to the same integer. If there is no overlap (more likely for large n), then the number of is in the filter will be k per data entry encoded.

Drone Registration Process

When a new database is to be added to the system, a new drone 50 is initiated at the location (e.g. customer site) of the database. An administrator at the controller 2 manually instigates a new drone registration process which contacts the new drone to cause the new drone to issue a registration request. The administrator adds a drone and gets a JWT (text) and supplies this text to someone who uses this text at the customer site 12. When the drone starts it sends a request including the JWT to the public API 16. On success the response contains a certificate which the drone needs for communication between 42 and 50, and a drone identifier. Drone identifiers are held in a list 44 at the controller 2. The list can be made accessible to customer with access constraints. The drone identifier identifies the drone and its location address to enable queries to be sent to it. Each drone has an association with its database at the customer site. The drone ID also indicates the attributes available to be searched in the database associated with that drone.

As mentioned above, in the response that is returned to a requesting user, the raw set of data entries which have been identified as a result of the multiple queries executed across multiple databases may be returned. Alternatively, the entries can be aggregated into groups according to attributes of the entries. For example, the groups could comprise statistical bins, each bin containing result entries with attributes in a defined parameter range for that attribute. The aggregated data is supplied to a user.

To increase anonymization (that is to decrease the likelihood of a particular data entry in a sparse set being able to be tied to a particular individual who could be identified) a redaction threshold can be applied of a minimum number of entries per bin. Another redaction threshold for entries in all bins could also or alternatively be applied, e.g. "small" bins can be removed.

As mentioned above, the embodiments described herein enable results across a number of different databases to be returned in response to a single query, in a manner which is "hidden" from a requesting user. Moreover, there is no need to join the records of the databases into a common dataset, so there is no requirement for the databases to be under any kind of common control or ownership.

The databases may be at separate geographical locations. The databases may be at separate IP addresses.

Figures 8A, 8B:
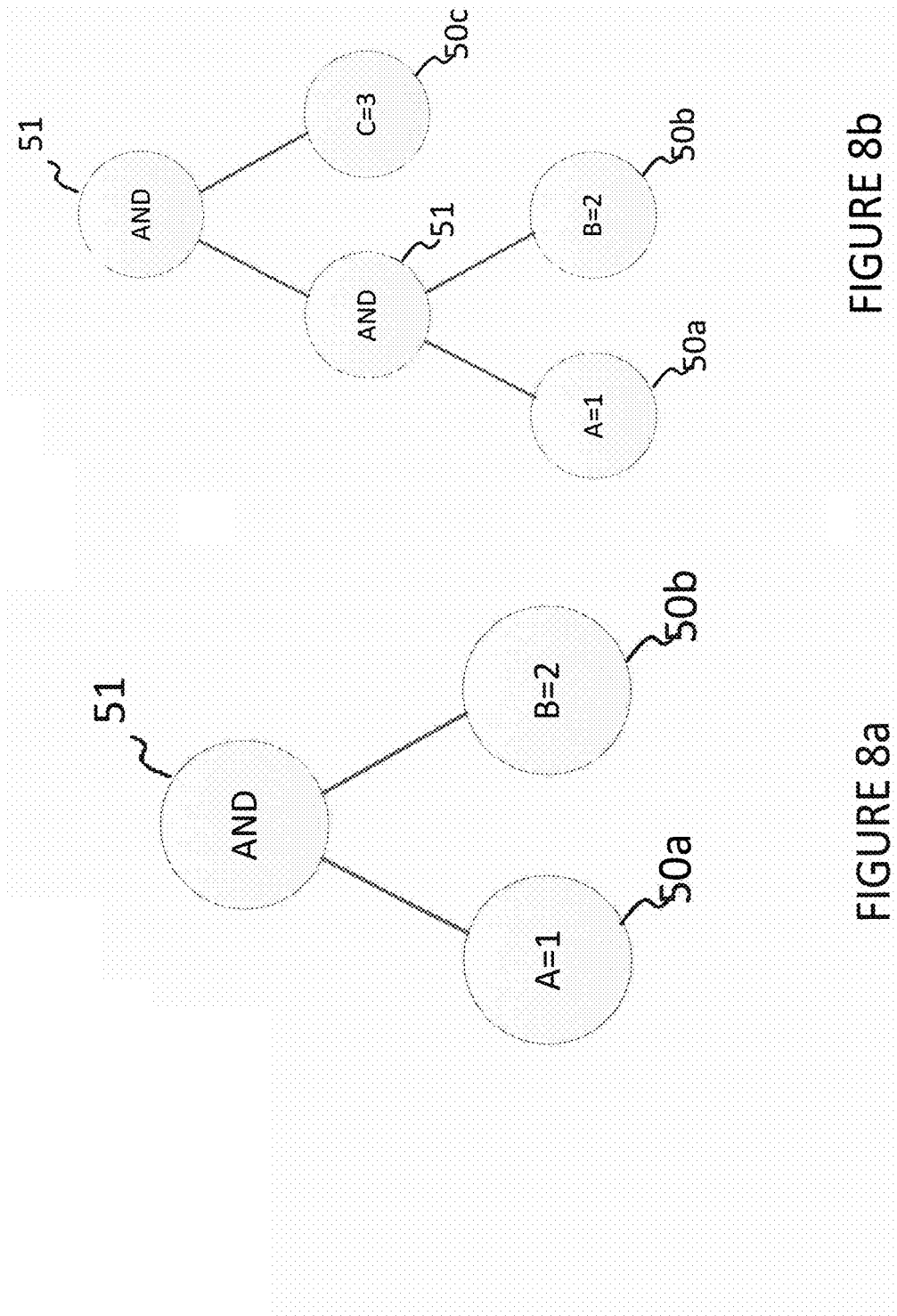
FIG. 8a and FIG. 8b are diagrams illustrating filtering expressions with logical operators.
Figure 9:
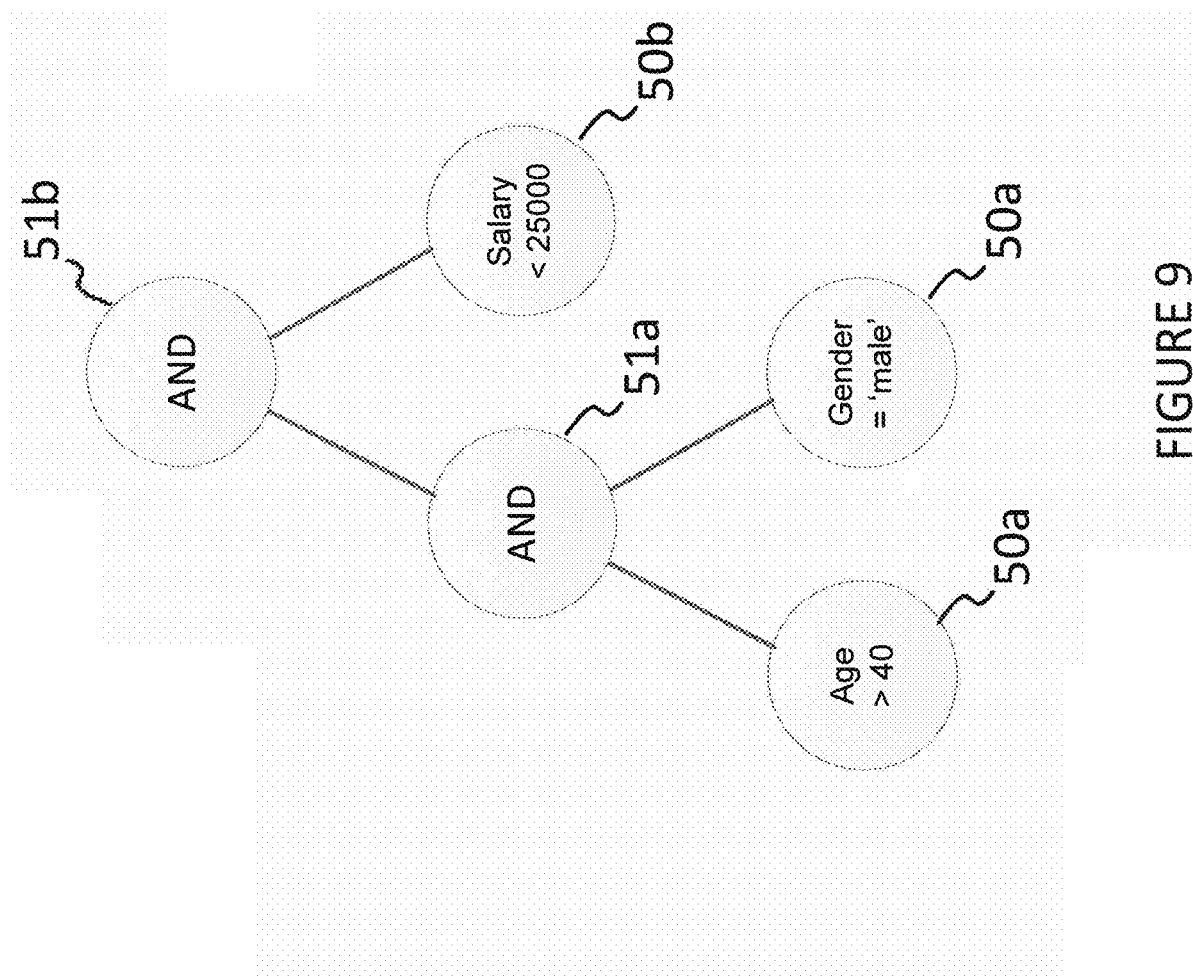
FIG. 9 is a diagram illustrating the process of querying multiple drones with a single joining key.
Figure 10:
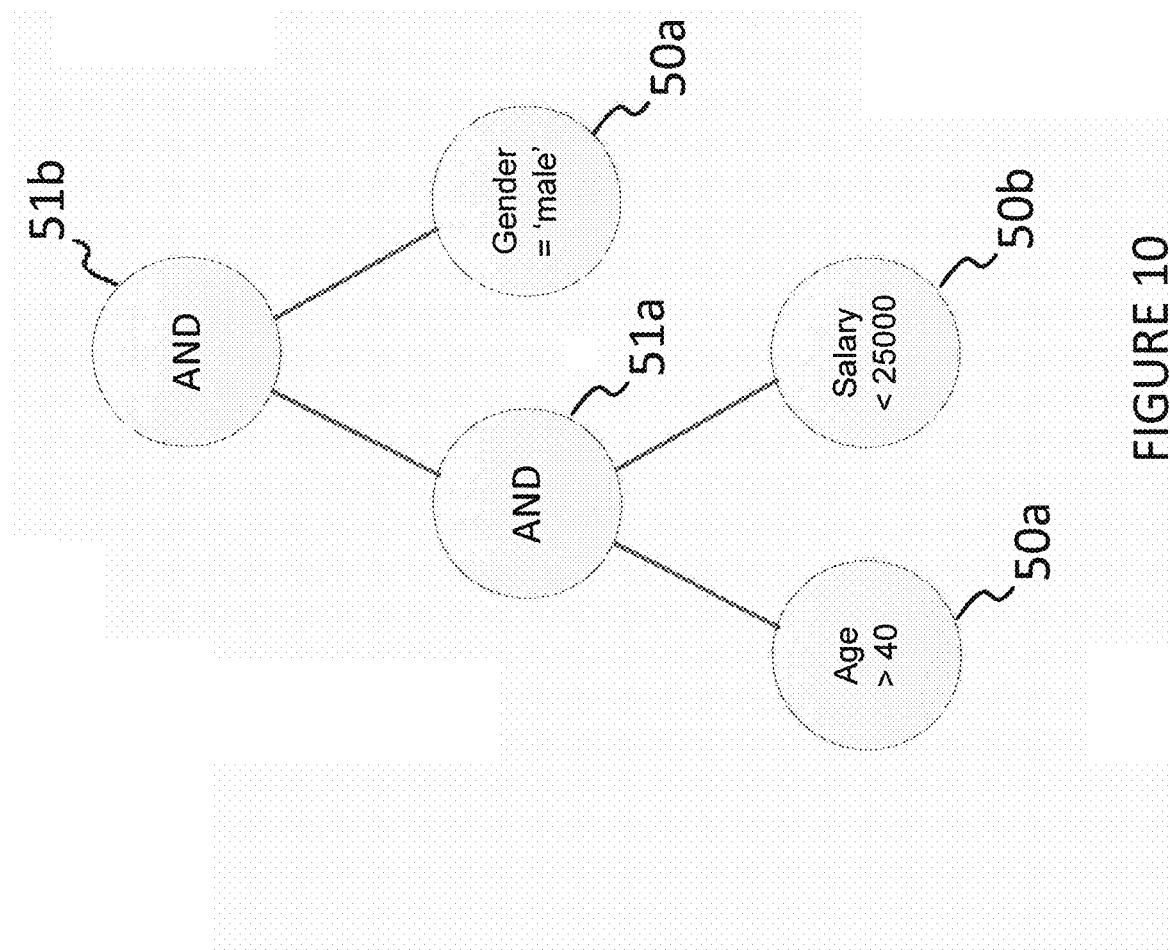
FIG. 10 is a diagram illustrating the process of querying multiple drones with a single joining key.

FIG. 8 to FIG. 10 exemplifies the process of querying multiple drones using a single joining key. For example, a combination of filtering expressions A=1 AND B=2 is shown in FIG. 8a to illustrate the use of an "AND" operator 51 for cross examining returned results at the drones 50a, 50b. Wherein an extra filter expression C=3 at drone 50c can be added and the filtering expressions may be represented as a tree in FIG. 8b, i.e. A=1 AND B=2 AND C=3. Each of the drones 50a, 50b and 50c is appropriated with a respective independent database.

In FIG. 9, the expressions A, B and C in FIG. 11b are replaced with actual filtering expressions (Age>40), (Gender="male") and (salary <25000). In this particular example, drone 50a contains both age and gender information and drone 50b contains salary information. Since the filtering expressions (Age>40) and (Gender="male") are both operable using a common operator (AND) 51a at drone 50a, they can be operated using a single query ("age>40 and gender="male").

In a first scenario where neither drones 50a nor 50b is the target drone, they both count the number of entries fitting their respective filtering expression, as follow, Count ("age>40 and gender="male") in drone 50a; and Count ("salary <25000") in drone 50b;

Assuming the count is relatively lower in drone 50a than that in drone 50b, the two drones then carry out filtering and each returns a filtering set, as follows, Query ("age>40 and gender="male") in drone 50a and return filtering ID set S1; and Query ("salary <25000" and filtering set ID set 1) in drone 50b and return filtering ID set S2 which returns a filtering ID set S2 at most the same amount of elements than in the filtering ID set S1.

The return filtering ID set S2, which has a higher count, is then sent to the target drone for generating the distribution.

In a second scenario where drone 50b is the target drone, no counting is required at the drones 50a and 50b, since drone 50b will be used to generate the distribution, e.g. the operation comprising the step of Query ("age>40 and gender="male") in drone 50a to return filtering set S1, and subsequently sending filtering expression ("salary<25000") and said filtering set S1 to drone 50b to generate the distribution.

A third scenario is shown in FIG. 10 where the scenario (A+B) and C is changed to (A+C) and B. The query comprises the filtering expression to "(Age>40 and gender='male') and salary<25000". The process is equivalent to that of the first scenario.

Example queries have the following form:
Target expression WHERE filter expression.

Figure 11:
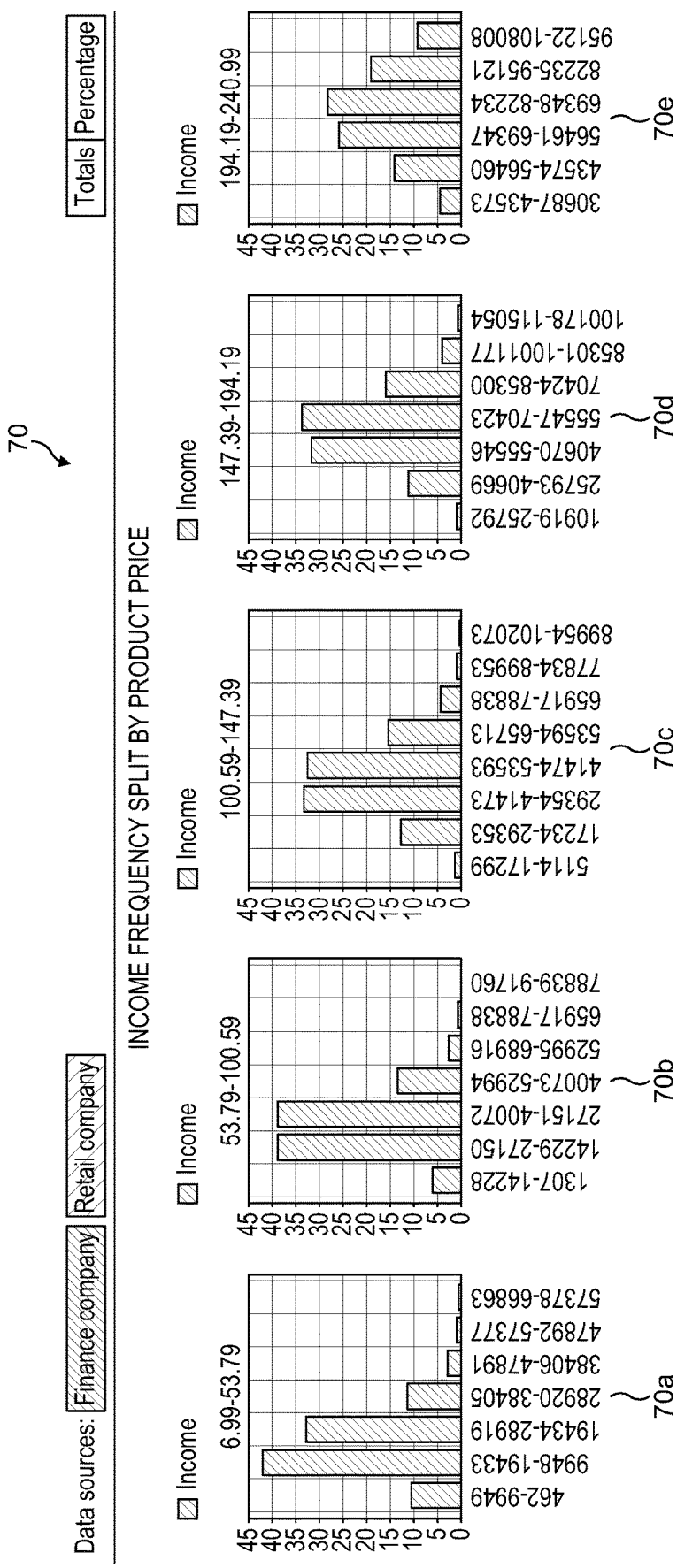
FIG. 11 shows an example output of a user screen.

FIG. 11 shows an example output of a user screen 70 for a user which has requested to join data from a finance company and a retail company.

The query Q1 underlying this is:
Distribution (Income) WHERE Distribution (Product Price)

The data shown in the bar graphs 70a-70e in FIG. 11 is income data which shows the number of people having income in certain ranges derived from a finance company. The numerical range on each bar graph differs and represents a product price range derived from the retail company.

Figure 12:
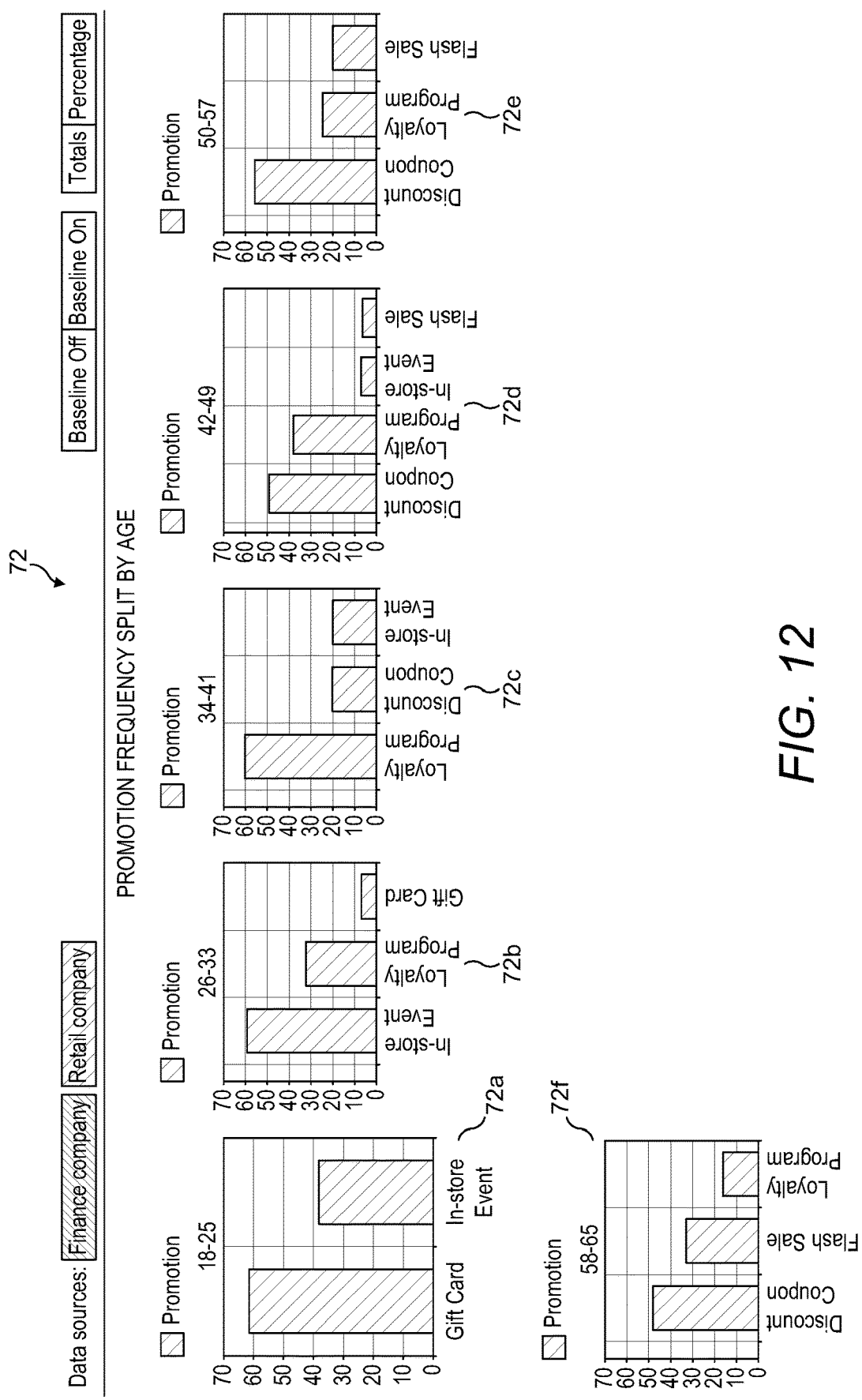
FIG. 12 shows another example output of a user screen.

FIG. 12 shows another example. In this example the data from the finance company indicates numbers of people in certain age range with certain income bracket, which is used to provide different bar graphs 72a-70f from the retail company concerning promotion types.

The query Q2 underlying this is:
Distribution (Promotion) WHERE (Distribution (Age) WHERE income>60000)

Figure 13:
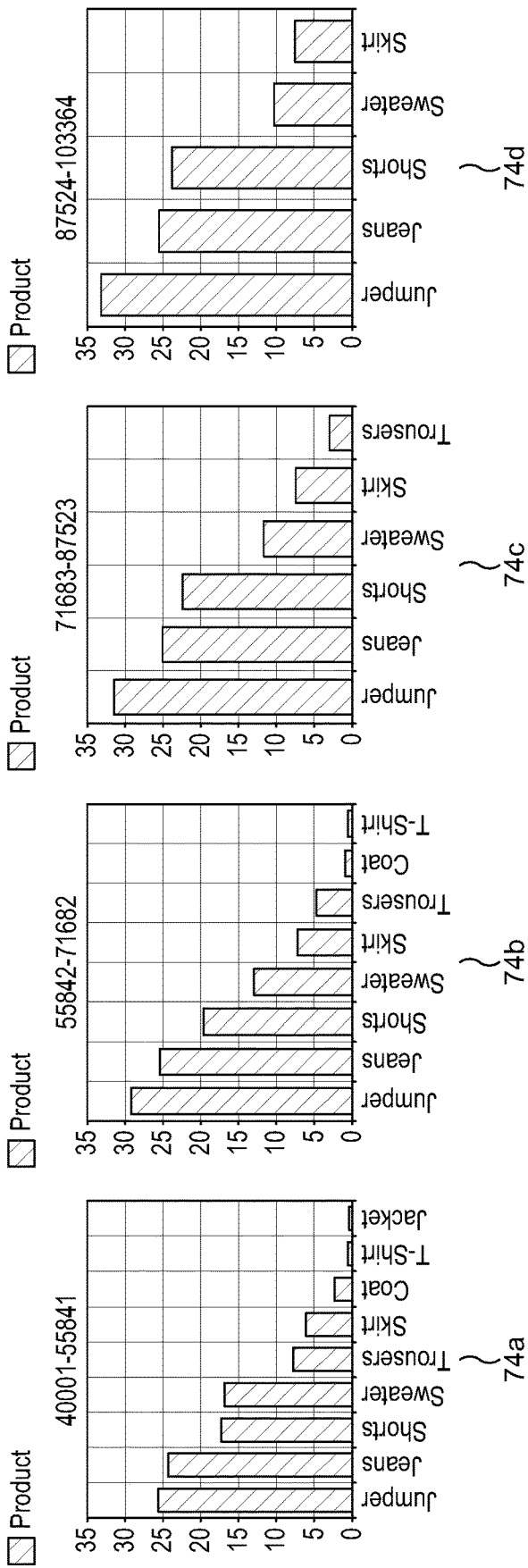
FIG. 13 shows yet another example output of a user screen.

FIG. 13 shows another example where the data from the finance company is used to provide income ranges which are used to generate bar graphs 74a-70d of product frequency from the retail company.

The query Q3 underlying this is:
Distribution (Product) WHERE (Distribution (income) WHERE income>40000 and product_price>80)

Some examples of filter expressions and their use are illustrated in the following table.

| Filter expression | Example use |
| --- | --- |
| Operator (>, >=, =, !=, <, <=) | age >40, Age >=40, town = "London" |
| Operator between | age between 25 and 30, town between 'a' and 'b' |
| Operator in | age in (15, 16, 24, 25), postcode in ('RG21 1CE', 'RG21 1CD') |
| Operator like | postcode like 'RG21 %' |
| Negated | Not age >40 |
| Combined via AND | age >40 and age >50, town > 'a' and town < 'b' |
| Combined via OR | age >60 or age <15 |

These example filter expressions may be applied to form the following example queries:

distribution(income) where (distribution(gender) where (distribution (age) where job_status !='unemployed')), represents "how is income distributed over genders and ages for not unemployed people".

distribution (private_health_insurance) where (distribution(age) where (distribution(visits_to_doctor) where age >50 and (income >45000 or retired=true))), represents "how many people have a private health insurance when they are over 50 and earn more than £45000 or are retired" The results are split up into 2 groups that is "age" and "visits_to_doctor" group".

sum(purchases) where (distribution(purchase_method) where (distribution(town) where (distribution(purchase_month and purchase_time>'28-10-2015') where (age between 18 and 29 and gender="female")))), represents "how much money have young females spend on purchases split up in the towns they live in, the month they made the purchase, and the method they used in the last 12 months".

As mentioned above, the importer module 52 defines the identifiers which will be used in common between the databases. Although it may be desirable to have identifiers which uniquely identify particular entries, it is not necessary for implementation of the concept described herein. It is anticipated that there may be errors where identifiers do not uniquely identify an individual entry, for example, customers having the same first and last names, or a single customer having multiple email addresses. However, error rates in aggregation may be acceptable in some cases. If error rates are not acceptable, mechanisms could be put in place to improve the accuracy, or to triage the identifiers to make sure they are unique.

It is noted that different customer databases may adopt different column headers for the same expression, therefore the importer module can be arranged to carry out normalisation on the column headers so as to produce a unified category (or identifier) for a given expression. The normalised data are exported from the "normal" database 54 to the database 12a against which queries will be run, the database 12a constituting an intermediate recipient database for the purpose of running the queries. It is possible to share high level data statistics between the databases once normalisation is finished, or while the database is being normalised. Normalisation can be carried out manually or automatically.

While various embodiments of the invention have been particularly shown and described, it will be understood by those skilled in the art that various changes in form and details may be made therein without departing from the spirit and scope of the invention as defined by the appended claims.

What is claimed is:

1. A method of accessing multiple independent databases with a single query having multiple expressions, the method comprising:
deriving from a single query at least one filtering query containing at least one filtering expression and a target query containing at least one target expressions;
searching a first one of the multiple independent databases using the at least one filtering query to obtain a filtering set of target entries matching the at least one filtering expression;
applying identifiers only of the filtering set of target entries and the target query to a second one of the multiple independent databases to search amongst the filtering set of target entries only in the second database for entries that match the target expression; and
generating a set of result entries from the second database which thereby satisfy the filtering expression and the target expression.

2. A method according to claim 1, comprising the step of aggregating the result entries into groups according to attributes of the entries.

3. A method according to claim 2, wherein the groups comprise statistical bins, each bin containing result entries with attributes in a predefined parameter range for that attribute.

4. A method according claim 3, comprising the step of applying a redaction threshold of a minimum number of entries per bin.

5. A method according to claim 3, comprising the step of applying a redaction threshold of a total minimum number of result entries.

6. A method according to claim 1, wherein the step of applying identifiers of a filtering set of target entries to a second one of the multiple independent databases comprises receiving at a controller the identifiers from the first one of the multiple independent databases, identifying the second one of the multiple independent databases at the controller and transmitting the identifiers of the filtering set of target entries to the second one of the multiple independent databases.

7. A method according to claim 1, wherein the step of applying identifiers of the filtering set of target entries to a second one of the multiple independent databases comprises the step of identifying the second one of the multiple independent databases based on the target expression and automatically transmitting the identifiers from the first one of the multiple independent databases to the second one of the multiple independent databases, without the identifiers passing through a central controller.

8. A method according to claim 1, wherein there is more than one filtering query, and a second one of the more than one filtering queries is used to search a further one of the multiple independent databases to obtain a further filtering set of target entries.

9. A method according to claim 1, which comprises the step of applying a further target query derived from the single query to a further target database selected from the multiple independent databases.

10. A method according to claim 1, comprising the step of associating with each one of the multiple independent databases a respective database agent.

11. A method according to claim 10, comprising the step of transmitting the at least one filtering query to a database agent associated with the first one of the multiple independent databases.

12. A method according to claim 1, comprising the step of encrypting the identifiers of the filtering set of target entries prior to applying the identifier to the second one of the multiple independent databases.

13. A method according to claim 12, comprising the step of transmitting the encrypted identifiers over a communication network from a central controller to the multiple independent databases.

14. A method according to claim 12, comprising the step of applying the identifiers to the second one of the multiple independent databases as a bloom filter or in a hashed form.

15. A control module comprising a computer arranged to execute a computer program in the form of computer readable instructions to configure the control module to:
receive a query having multiple expressions;
derive from the query at least one filtering query containing at least one filtering expression and a target query containing at least one target expression;
identify a first one of multiple independent databases and apply the at least one filtering query to the identified first database;
receive identifiers of a filtering set of target entries matching the at least one filtering expression as a result of applying the filtering query to the first database;
identify a second one of the multiple independent databases; and
cause the identifiers only of the filtering set of target entries to be applied to the second database with the target query to search for any of the target entries in the second database that match the target expression;
whereby a set of result entries from the second database which satisfy the filtering expression and the target expression is generated.

16. A computer system comprising a control module comprising a computer arranged to execute a computer program in the form of computer readable instructions to configure the control module to:
receive a query having multiple expressions;
derive from the query at least one filtering query containing at least one filtering expression and a target query containing at least one target expression;
identify a first one of multiple independent databases and apply the at least one filtering query to the identified first database;
receive identifiers of a filtering set of target entries matching the at least one filtering expression as a result of applying the filtering query to the first database;
identify a second one of the multiple independent databases; and
cause the identifiers only of the filtering set of target entries to be applied to the second database with the target query to search for any of the target entries in the second database that match the target expression;
whereby a set of result entries from the second database which satisfy the filtering expression and the target expression is generated, the control module in communication with multiple independent databases via a communication network, wherein each of the multiple independent databases is in communication with the control module via a separate independently operable communication link, and wherein the step of applying the filtering query to a first one of the databases comprising transmitting the filtering query over a first one of the communication links to the first database, and wherein the step of applying identifiers of the target entries and the target query comprise transmitting the identifiers and the target query to the second database over a second communication link.

17. A computer system according to claim 16, wherein the first and second independent databases are at least one of: separate geographical locations; and separate IP addresses.

18. A computer system according to claim 16, wherein the first and second independent databases are under independent control, with a privacy restriction between the data comprised in each of the first and second independent databases.

19. A computer system according to claim 16, wherein each of the independent databases is associated with a local database agent which is configured to receive the filtering query or target query respectively and apply it to their associated database.

20. A computer system according to claim 19, wherein the database agent has access to a configuration file which defines the content of the associated database.

\* \* \* \* \*